United States Patent [19]

Nelson et al.

[11] 3,929,668

[45] Dec. 30, 1975

[54] ZEOLITIC CATALYTIC CRACKING CATALYSTS

[75] Inventors: Gerald V. Nelson, Nederland; Douglas J. Youngblood, Groves; James H. Colvert, Port Arthur, all of Tex.

[73] Assignee: Texaco Inc., New York, N.Y.

[22] Filed: Apr. 27, 1970

[21] Appl. No.: 29,758

Related U.S. Application Data

[63] Continuation of Ser. No. 717,968, April 1, 1968, abandoned.

[52] U.S. Cl. ............................. 252/455 Z; 208/120
[51] Int. Cl.² ........................................ B01J 29/06
[58] Field of Search ............................... 252/455 Z

[56] References Cited
UNITED STATES PATENTS

| | | |
|---|---|---|
| 3,247,098 | 4/1966 | Kimberlin, Jr. et al. ........ 252/455 Z |
| 3,325,397 | 6/1967 | Plank et al. ..................... 252/455 X |
| 3,329,628 | 7/1967 | Gladrow et al. ................ 252/455 X |
| 3,449,070 | 6/1969 | McDaniel et al. .............. 252/455 Z |
| 3,518,051 | 6/1970 | Maher et al. .................... 252/455 Z |
| 3,553,104 | 1/1971 | Stover et al. .................... 252/455 Z |

*Primary Examiner*—Carl F. Dees
*Attorney, Agent, or Firm*—Thomas H. Whaley; Carl G. Ries

[57] ABSTRACT

There is provided a method for increasing the catalytic cracking activity, selectivity and attrition resistance of a crystalline aluminosilicate containing catalytic cracking catalyst by treating the catalyst at a temperature above about 1300°F. and below the thermal destructive temperature of the crystalline aluminosilicate in the absence of steam. The above treatment provides an improved catalytic cracking catalyst for utilization in the cracking of a hydrocarbon charge under catalytic cracking conditions.

26 Claims, No Drawings

ZEOLITIC CATALYTIC CRACKING CATALYSTS

This is a continuation of application Ser. No. 717,968, filed Apr. 1, 1968, now abandoned.

This invention relates to improved catalytic compositions and to the conversion of hydrocarbon oils employing such catalysts. In particular, this invention relates to improved zeolitic catalytic cracking catalysts possessing superior activity, selectivity and attrition resistance. This invention further relates to a method for preparing improved catalytic cracking catalysts and to hydrocarbon conversion processes employing such catalysts wherein heavier petroleum fractions are cracked to lighter materials predominantly in the gasoline boiling range.

The cracking of heavier petroleum fractions into lighter and more valuable constituents has previously been accomplished by the use of elevated temperatures customarily referred to as thermal cracking. In more recent times the cracking process for producing lighter and more valuable hydrocarbons, such as gasoline, has been the catalytic cracking method wherein numerous materials both natural and synthetic have been employed as catalysts. While the ability to facilitate cracking of the hydrocarbon in and of itself is significant, the catalyst must additionally possess other desirable characteristics such as the ability to convert a given charge stock to a variety of desired and preselected products under particular conditions of temperature, pressure and space rate, normally termed activity. In addition to activity, the catalyst must provide selectivity, i.e., the ability to convert the charge stock into desired products with minimal by-product formation, as, for example, providing high gasoline yields along with low gas and low coke yields. A third highly important catalyst characteristic is its ability to withstand attrition over a period of continuous handling and regeneration. Catalysts possessing poor attrition resistance soon abrade and fragment giving rise to excessive amounts of finely divided material which are generally unusable in conventional catalytic equipment and consequently deleterious to the process and processing equipment.

More recently, manufacturers of catalytic cracking catalysts and hydrocarbon conversion processors have suggested that the activity, selectivity and attrition resistance of crystalline zeolitic catalysts could be improved by conditioning the catalyst in the presence of steam at elevated temperatures from about 500°F. and higher. Further, after employing the catalyst in a hydrocarbon conversion process the carbonaceous deposit laid down on the catalyst commonly referred to as coke, was removed through a regeneration cycle at elevated temperatures also in the presence of steam. While the combination of steam and heat provided the catalytic material with acceptable commercial levels of activity, selectivity and attrition resistance, such levels of catalytic properties left great room for improvement.

It is therefore an object of this invention to provide an improved catalytic composition possessing superior activity, selectivity and attrition resistance.

Another object of this invention is to provide a method for the preparation of catalytic materials possessing superior activity, selectivity and attrition resistance.

A further object of this invention is to provide a hydrocarbon conversion process employing improved catalytic cracking catalysts.

Other objects and advantages will become apparent from the following detailed description and examples.

Broadly, this invention contemplates a method for increasing the catalytic cracking activity, selectivity and attrition resistance of a crystalline aluminosilicate containing catalytic cracking catalyst which comprises treating said catalyst at a temperature above about 1300°F. and below the thermal destructive temperature of the crystalline aluminosilicate contained therein.

In another embodiment, there is contemplated an improved catalytic cracking catalyst containing a crystalline aluminosilicate, where the catalyst is characterized by enhanced activity, selectivity and attrition resistance, by treating a zeolitic cracking catalyst at a temperature above about 1300°F. and below the thermal destructive temperature of the zeolite contained therein.

In a further embodiment, we contemplate a process for the cracking of a hydrocarbon charge by contacting the charge under catalytic cracking conditions with a crystalline aluminosilicate cracking catalyst treated at a temperature above about 1300°F. and below the thermal destructive temperature of the zeolite contained therein.

In accordance with this invention the superior catalysts prepared according to the instant method as hereinafter more fully described comprises a high activity material characterized as crystalline aluminosilicates including both the naturally occurring and synthetic varieties. In general, such crystalline aluminosilicates possess an ordered rigid 3-dimensional structure having uniform pore diameters ranging from about 4 to about 15 Angstrom units, generally referred to in the art as zeolites. Catalytic cracking zeolites because of their extremely high activity are composited with a material possessing lower catalytic activity as, for example, a silica-alumina matrix which may be of the synthetic, semi-synthetic or natural clay type. Alternatively silica gel, silica-beryllia, silica-magnesia, silica-thoria, silica-titania and silica-zirconia may be employed in place of silica-alumina. Preferably, materials such as silica-alumina and silica-magnesia form a substantial portion of the catalyst because they have proven through past commercial experience to possess good cracking catalyst properties. In general, the composite crystalline zeolitic catalysts comprise from about 1 to 25 percent zeolite, 10 to 50 percent alumina, and the remainder silica.

The zeolitic catalysts which form the high activity component of the catalyst composition are natural or synthetic alkali metal crystalline aluminosilicates which have been treated to replace all or at least a substantial portion of the original alkali metal ions with other cations such as hydrogen and/or a metal or combination of metals such as barium, calcium, magnesium, mangenese or rare earths (e.g. cerium, lanthanum, neodymium, praseodymium, samarium and yttrium). The zeolites contemplated above may be represented by the formula $M_{2/n}O:Al_2O_3:xSiO_2:yH_2O$ where M represents hydrogen or a metal, $n$ its valence, $x$ has a value ranging from 1 to 10 and $y$ ranges from 0 to 10. In dehydrated zeolites, $y$ will be substantially zero. In the instant invention, the preferred zeolites contemplated are either natural or synthetic zeolites represented by faujasite, zeolite X, zeolite Y, and mordenite. In highly preferred embodiments M is selected from the group consisting of hydrogen, calcium, manganese and the rare earth metals.

Briefly, known processes for preparing crystalline aluminosilicates involve heating in an aqueous solution an appropriate mixture of oxides or materials whose chemical composition can be completely represented as a mixture of the oxides $Na_2O$, $Al_2O_3$, $SiO_2$ and $H_2O$, at a temperature ranging from 25°C. to 125°C. for periods of 15 minutes to 90 hours or more. The product which crystallizes within this mixture is separated and waterwashed until the water in equilibrium with the crystalline zeolite has a pH ranging from 9 to 12 and is thereafter dehydrated by heating. Typically, an alkali metal silicate serves as the source of silica and an alkali metal aluminate as the source of alumina. An alkali metal hydroxide is suitably used as the source of the alkali metal ion and in addition contributes to the regulation of the pH. The alkali metal portion is thereafter base exchanged until substantially free of alkali metal with a solution characterized by a pH in excess of 4.5 and containing an ion capable of replacing the alkali metal such as by exchanging with aqueous solutions of ammonium chloride and/or rare earth chlorides. Anions introduced as a result of treating ion-exchange solution are removed by water washing. The crystalline alkali metal aluminosilicate may be ion-exchanged either before or after admixing with a siliceous gel matrix material. The metal aluminosilicate is intimately admixed with a siliceous gel by methods such as ball milling the aluminosilicate with a siliceous hydrogel over an extended time period or by dispersing powdered aluminosilicate in a siliceous hydrosol. The siliceous gel employed can be prepared from a natural clay, from silica gel or from a cogel of silica and an oxide of at least one metal from Groups IIA, IIIB and IVA of the Periodic Table. The material is thereafter dried at 150° to 600°F. for 4 to 48 hours. To further facilitate drying, calcination at temperatures of 800°F. or higher for 1 to 48 hours in an inert atmosphere was optionally proposed. Finally, the prior art treatments directed that a mild steam treatment for catalyst activation and selectivity be undertaken at a temperature range of 1000°–1400°F. for 2 to 100 hours. Temperatures above 1500°F. were suggested as detrimental and were to be avoided.

It has been unexpectedly found that a final treatment at temperatures ranging from above about 1300°F. to about below the thermal destruction temperature of the zeolitic material, preferably between 1400° and 1550°F., in the absence of steam provides the zeolitic composited catalyst with higher activity, selectivity and attrition resistance than heretofore available. Some zeolitic composited catalysts contain more thermally stable zeolites and can be heat treated at temperatures in excess of 1700°F. to obtain the above catalyst improvements. The improved catalytic properties are realized albeit that the surface area of the zeolite containing catalyst is concomitantly reduced in many instances by 50% or more. Also, the quantity of zeolite in the catalyst is generally reduced by this heat treatment as indicated in Table II below while the activity of the catalyst increases. It appears that activity and surface area are independent variables, within the operative temperature range, such that at given surface areas, widely divergent activities are obtainable.

In the Example I, Table III comparisons between surface area, heat treatment temperature and activity demonstrate that as the surface area of a commercially available zeolitic catalyst is decreased from about 353 square meters per gram to about 175 square meters per gram under progressively higher heat treating temperatures, the catalyst activity measured at about 33.5 rapidly maximizes to 62.4 at a temperature of 1480°F. and thereafter sharply declines to 43.1 at 1650°F. Above 1650°F., further reduction of surface area closely correlates with catalyst activity. In comparison, normal treating temperatures conventionally used in the art of about 1200° to 1300°F. show an activity of about 40 to 42. For purposes of comparison a conventional catalytic cracking catalyst such as UOP high alumina, UOP low alumina, Davison high alumina, Davison low alumina, Nalco high alumina, Nalco low alumina, American Cyanamid high alumina, American Cyanamid low alumina and Filtrol 100 when exposed to heat treatment temperatures over the range of 1,000 to 1600°F. and higher demonstrated that as the surface area of the catalyst decreased so did the activity. It was therefore totally unexpected that the surface area though decreasing with the crystalline zeolitic content would provide an activity in direct opposition to that which might otherwise have been predicted. Likewise, as more fully presented in the examples below the selectivity and attrition resistance of the catalytic material contemplated herein are substantially improved by the heat treatment at the temperatures prescribed above. The heat treatment has been found to be effective not only when pretreating the catalyst immediately prior to actual use but such treatment has been found to possess long term effects, i.e., the treatment may be undertaken by a catalyst manufacturer and the catalyst stored for an extended periods of time without reduction of the properties described herein.

For the purpose of more fully illustrating the nature of our invention and the unexpected results gained therefrom the following examples are presented.

The catalysts below were evaluated for activity and selectivity with a gas oil from North Texas Special Crude having the following characteristics:

TABLE I

| Properties | Fresh Charge Stock |
|---|---|
| Gravity, °API | 36.7 |
| Pour Point, °F. | 20 |
| X-ray sulfur, weight % | 0.08 |
| Bromine Number | 3 |
| Conradson carbon residue, weight % | None |
| Sodium by flame Photo., ppm | 0.68 |
| ASTM Distillation °F. | |
| IBP | 444 |
| 5% | 480 |
| 10 | 493 |
| 20 | 512 |
| 30 | 526 |
| 40 | 538 |
| 50 | 552 |
| 60 | 566 |
| 70 | 582 |
| 80 | 607 |
| 90 | 646 |
| 95 | 686 |
| EP | 708 |

The fresh catalyst employed in the fluidized bed catalytic cracking experiments conducted were all commercially available materials as tabulated and identified below. The tabulated properties correspond to and represent the materials evaluated. In the course of evaluation and testing three different lots of catalyst A and Catalyst D were employed.

TABLE II

| Catalyst | A | B | C | D | E | F | G | H |
|---|---|---|---|---|---|---|---|---|
| Properties | | | | | | | | |
| Surface area, m²/gm | 353 | 499 | 591 | 327 | 321 | 279 | 216 | 506 |
| Pore volume, cc/gm | 0.72 | 0.76 | 0.66 | 0.77 | 0.56 | 0.58 | 0.53 | 0.89 |
| Sodium, weight percent | 0.04 | 0.09 | 0.07 | 0.02 | 0.02 | 0.015 | 0.03 | 0.07 |
| Alumina, weight percent | 34.1 | 14 | 16.2 | 32.4 | 27.2 | 34.9 | 16.1 | 14.7 |
| Zeolite content weight percent | 18 | 19 | 5 | 3 | 5 | 11 | 13 | 6 |
| Zeolite content, weight percent after 17 hours at 1480°F. | 11 | 8 | 5 | 3 | 1 | 5 | 4 | — |
| Cerium, weight percent | 2.0 | 3.4 | 0.98 | 0.48 | 0.46 | 0.91 | 1.1 | 0.02 |
| Lanthanum, weight percent | 0.93 | 1.2 | 0.25 | 0.13 | 0.13 | 0.32 | 0.34 | 0.02 |

Catalysts A through H identified above were each dried and adsorbed water removed by heating initially at 300°F., thereafter at 800°F. for 1 hour and finally at 1,000°F. for 2 hours. After this drying period the catalyst was subjected to the desired heat treatment for varying specified periods of time and subsequently evaluated for activity, selectivity and attrition resistance more fully described below.

The catalysts A through H for purposes of comparison were also subjected to an initial drying treatment as described above along with a subsequent steam treatment consisting of exposing the catalyst at temperatures ranging from 900° to 1150°F. and pressures from 0 to 150 p.s.i.g. under steam velocities ranging from 0.03 to 0.3 fps for varying periods of time.

The tests for catalytic activity consisted of employing 400 grams of catalyst under the following test conditions:

| | |
|---|---|
| Reactor Temperature, °F. | 920 |
| Space Velocity, $W_{oil}/hr/W_{catalyst}$ | 2.0 |
| Weight ratio: catalyst/oil | 1.0 |
| Reaction time, hr | 0.5 |

The activity was measured by fractionating the cracked liquid product to a 390°F. cut point. The activity is calculated as 100 minus the volume percent gas oil above 390°F. recovered from the fractionator. The selectivity of the catalyst is the volume percent of naphtha yield divided by the conversion. Conversion is calculated as 100 minus the volume percent gas oil above 390°F. basis total feed. The attrition of the catalyst is reported as 100 times the sum of the percent fines in the attrited sample minus the percent fines in the original divided by 100 minus the percent fines in the original.

EXAMPLE I

In this experiment Catalyst A, untreated, was compared to samples heat treated at progressively higher temperatures with the results tabulated in Table III.

TABLE III

| Heat Treatment | | | | | | | | | | | |
|---|---|---|---|---|---|---|---|---|---|---|---|
| time, hours | — | 17 | 17 | 17 | 17 | 17 | 3 | 3 | 3 | 3 | 3 |
| temperature, °F. | — | 1200 | 1300 | 1350 | 1400 | 1480 | 1525 | 1575 | 1600 | 1650 | 1675 |
| Tests | | | | | | | | | | | |
| Surface area, m²/gm | 353 | 306 | 281 | 267 | 238 | 245 | — | 227 | 164 | 144 | 65 |
| Pore volume, cc/gm | 0.72 | — | 0.73 | — | — | 0.63 | 0.65 | 0.57 | 0.51 | 0.44 | 0.22 |
| Results | | | | | | | | | | | |
| Activity | 33.5 | 40.2 | 42.6 | 46.4 | 53.5 | 62.4 | 59.4 | 56.7 | 53.0 | 43.1 | 22.6 |
| Conversion Vol.% Feed | 54.8 | 59.7 | 60.0 | 61.7 | 64.9 | 73.6 | 71.3 | 66.4 | 61.5 | 54.7 | 29.3 |
| Naphtha, Vol.% Feed | 22.1 | 25.9 | 29.0 | 31.8 | 39.4 | 43.2 | 41.3 | 43.2 | 42.7 | 33.5 | 19.8 |
| Naphtha/conversion ratio | 0.40 | 0.44 | 0.48 | 0.52 | 0.61 | 0.59 | 0.58 | 0.65 | 0.70 | 0.61 | 0.68 |

As can be seen from the data in Table III, increasing heat treatment temperatures correspondingly cause a decreasing catalytic surface area. However, as the treating temperature was raised step wise, particularly above 1300°F., the catalytic activity rapidly increased until optimum activity occurred between 1400° and 1600°F., with highest performance between 1480° and 1525°F. At treating temperatures above 1650°F. catalyst activity rapidly decreased to below that of the untreated sample. From the data presented above it appears that a transformation occurred in the catalytic material during progressive heat treating which provided the catalyst with enhanced activity and selectivity. From the above it was concluded that within the designated temperature range catalyst activity operates independently of catalyst surface area. Treatment at temperatures above 1650°F. appear to destroy the zeolites crystalline structure such that the treated catalyst thereafter behaves as a conventional silica alumina cracking catalyst. Moreover, the heat treated molecular sieve catalysts gave a lower carbon and gas yields than conventional catalyst providing enhanced selectivity (naphtha/conversion ratio) as can be seen from the table. The selectivity data presented demonstrate that as treating temperature increases within the designated temperature range naphtha volume percent feed increases along with the naphtha/conversion ratio.

Similar treatment of catalyst B showed substantially the same result when exposed to the temperatures tabulated below:

TABLE IV

| Heat Treatment | | | | |
|---|---|---|---|---|
| time, hours | — | 17 | 17 | 17 |
| temperature, °F. | — | 1480 | 1600 | 1700 |
| Tests | | | | |
| Surface area, m²/gm | 508 | 262 | 224 | 53 |
| Activity | 39 | 62.3 | 62.9 | 21.4 |

EXAMPLE II

Catalyst C was employed in the following tests comparing the effects of untreated catalyst ($C^1$) with heat treated catalyst ($C^4$), with steam treated catalyst ($C^2$) and steam and heat treated catalyst ($C^3$). The steam and heat treatments employed are shown in Table V.

TABLE V

| Catalyst | $C^1$ | $C^2$ | $C^3$ | $C^4$ |
|---|---|---|---|---|
| Treating Conditions | | | Steam followed | |
| Type | — | Steam | by Heat | Heat |
| Time, hours | — | 3 | 17 | 17 |
| Temperature, °F. | — | 1150 | 1480°F. | 1480°F. |
| Pressure, psig | — | 150 | — | — |
| Velocity, FPS | — | 0.1 | — | — |
| Tests | | | | |
| Surface area, m²/gm | 591 | 155 | 130 | 390 |
| Activity | 46.1 | 42.5 | 49 | 59 |

A similar experiment was repeated with a batch of catalyst D where the material had an initial surface area of 327 m²/gm and an activity of 35. After steam treatment the surface area decreased to 117 m²/gm and the activity diminished to 31. Subsequent heat treatment of the steamed sample further decreased the surface area to 110 m²/gm while the activity increased to 37.5.

EXAMPLE III

Catalyst E was similarly treated as in Example II where the material had an initial surface area of 321 m²/gm and an activity of 37.3. After heat treatment at 1480°F. for 3 hours the surface area diminished to 205 m²/gm while its activity increased to 43.5. Steam treatment of the initial material at 1150°F. and 150 psig for 3 hours reduced the surface area to 90 m²/gm and severely reduced the activity to 23. Evaluation of catalyst G possessing an initial surface area of 216 m²/gm and an activity of 42.9 was similarly steam and heat treated as catalyst E. After heat treatment the catalyst had a surface area of 200 and an activity of 50.6. Steam treatment of the initial material reduced the surface area to 122 m²/gm and the activity to 38.2.

EXAMPLE IV

A different batch of catalyst A having an initial surface area of 350 m²/gm was initially heat treated for 17 hours at 1480°F. The surface area of the material diminished to 226 square meters per gram while the activity increased from 37.5 to 53.5. The material was subsequently steam treated at 1,050°F. and 100 psig for 1 hour as 0.1 fps causing a decrease in surface area to 188 m²/gm and an activity reduction to 50. This material was further heat treated for 17 hours at 1480°F. whereupon the activity increased to 57 while the surface area was further reduced to 157 m²/gm.

EXAMPLE V

The rate of attrition defined as:

$$\frac{100\ [(\text{Weight percent fines in attrited sample}) - (\text{weight percent fines in original sample})]}{100 - \text{Weight percent fines in original sample}}$$

was determined on catalysts A and D. The attrition test employed is essentially as described in Ind. Eng. Chem. 41, 1200 (1949) while utilizing the micromesh sieve technique described in Petroleum Refiner Vol. 40, No. 10, pp. 139–144 (1961) to determine the fines content. The Table below summarizes the results.

TABLE VI

| Catalyst | A | | D | |
|---|---|---|---|---|
| Heat Treatment Conditions | | | | |
| Time, Hours | None | 17 | None | 17 |
| Temp. °F. | | 1480 | | 1480 |
| One Hour Attrition Test Results | | | | |
| Attrition, 0–20 micron | 25.6 | 18.9 | 15.0 | 12.3 |
| Attrition, 0–20 micron | 35.0 | 30.7 | 22.4 | 20.8 |

As can be seen from Table VI, the rate of attrition of both Catalyst A and D was substantially reduced in those instances where the catalyst had been pretreated according to the instant invention.

EXAMPLE VI

Table VII below demonstrates the heat treatment, within the prescribed temperature range, additionally significantly improves the selectivity of the catalytic material. High naphtha/conversion ratios and lower coke/conversion ratios were obtained with heat treated

TABLE VII

| Catalyst | A | | D | | F | |
|---|---|---|---|---|---|---|
| Heat Treatment Conditions | | | | | | |
| Time, Hours | None | 17 | None | 17 | None | 17 |
| Temp, °F. | — | 1480 | — | 1480 | — | 1480 |
| Tests | | | | | | |
| Activity | 34.1 | 58.4 | 32.0 | 53.0 | 30.9 | 47.9 |
| Naphtha/conversion ratio | 0.42 | 0.58 | 0.37 | 0.63 | 0.42 | 0.61 |
| Coke/conversion ratio | 0.094 | 0.061 | 0.078 | 0.029 | — | — | catalysts. In this example, yet another batch of catalyst A was employed.

EXAMPLE VII

Catalyst H contains a zeolite which is more heat stable than the previously evaluated Catalysts A–G. Hence, it may be heated at temperatures above 1650°F. while still providing the catalyst with enhanced activity and selectivity as shown in Table VIII.

TABLE VIII

| Heat Treatment | | | |
|---|---|---|---|
| Time, hours | — | 17 | 3 |
| Temperature, °F. | — | 1480 | 1725 |
| Tests | | | |
| Surface area, m²/gm | 506 | 262 | 100 |
| Activity | 43.8 | 62.3 | 66.2 |
| Naphtha/conversion | .42 | .755 | .799 |

EXAMPLE VIII

Another batch of Catalyst D was heat treated at 1600°F. for varying periods of time to demonstrate the effect of heat exposure time on catalyst activity and selectivity. Table IX tabulates the results obtained.

TABLE IX

| Heat Treatment | | | | | |
|---|---|---|---|---|---|
| Time, minutes | — | 15 | 30 | 60 | 180 |
| Temperature, °F. | — | 1700 | 1600 | 1600 | 1600 |
| Tests | | | | | |
| Activity | 34.4 | 47.0 | 46.8 | 48.7 | 49.4 |
| Naphtha/Conversion | 0.41 | .63 | .58 | .64 | 0.61 |

The above results demonstrate that short exposure times may be used to provide a catalyst with improved activity and selectivity. In general, when higher treating temperature are employed, that is, up to the thermal destructive temperature of zeolitic component of the contemplated catalytic cracking catalyst, shorter exposure times are permissible. While the aforementioned examples demonstrated exposure times ranging from 15 minutes to 17 hours, shorter and longer periods may be employed. While effective treating temperatures of from 1300°F. up to the thermal destructive temperature of the zeolite contained in the catalyst has been demonstrated to be applicable, we prefer to employ temperature of from 1400° to 1500°F. In general, and depending upon the zeolite contained in the catalyst thermal destructive temperatures occur at about 1700°F. and higher.

We claim:

1. A process of increasing the catalytic cracking activity, selectivity and attrition resistance of a catalytic cracking catalyst comprising a zeolitic crystalline aluminosilicate in a siliceous matrix, said catalyst having been rendered catalytically active previously by a process comprising drying and calcining, which comprises heat treating said catalyst at a temperature above about 1300°F. and below the thermal destructive temperature of said zeolitic crystalline aluminosilicate contained therein in the absence of steam.

2. A process according to claim 1 wherein said treating is conducted at a temperature of from about 1400° to about 1550°F.

3. A process according to claim 1 wherein the zeolitic crystalline aluminosilicate is selected from the group consisting of faujasite, zeolite X, zeolite Y and mordenite.

4. A process according to claim 3 wherein said zeolite crystalline aluminosilicate contains cations selected from the group consisting of hydrogen, barium, calcium, magnesium, manganese, rare earths and combinations thereof.

5. A process according to claim 1 wherein said catalyst comprises from about 1 to 25 weight percent zeolitic crystalline aluminosilicate and from about 99 to 75 weight percent of a catalytically active siliceous matrix.

6. A process according to claim 5 wherein said catalytically active siliceous matrix is a synthetic, semisynthetic or natural clay-type silica-alumina.

7. A process according to claim 5 wherein said catalytically active siliceous matrix is silica-mangensia.

8. An improved catalytic cracking catalyst comprising a zeolitic crystalline aluminosilicate in a siliceous matrix, said catalyst characterized by enhanced activity, selectivity and attrition resistance, the improvement of which comprises heat treating said catalyst at temperature above about 1300°F. and below the thermal destructive temperature of said zeolitic crystalline aluminosilicate contained therein in the absence of steam, said improvement being performed on a catalyst previously rendered catalytically active by a process comprising drying and calcining.

9. A catalyst according to claim 8 wherein said treating is conducted at a temperature of from about 1400 to about 1550°F.

10. A catalyst according to claim 8 wherein the zeolitic crystalline aluminosilicate is selected from the group consisting of faujasite, zeolite X, zeolite Y and mordenite.

11. A catalyst according to claim 10 wherein said zeolitic crystalline aluminosilicate contains cation selected from the group consisting of hydrogen, barium, calcium, magnesium, manganese, rare earths metals and combinations thereof.

12. A catalyst according to claim 8 wherein said catalyst comprises from about 1 to 25 weight percent zeolitic crystalline aluminosilicate and from about 9 to 75 weight percent of a catalytically active siliceous matrix.

13. A catalyst according to claim 12 wherein said catalytically active siliceous matrix is a synthetic semisynthetic or natural clay-type silica-alumina.

14. A catalyst according to claim 12 wherein said catalytically active siliceous matrix is silica-magnesia.

15. A process of preparing a catalytic cracking catalyst which comprises:
   a. calcining a material comprising zeolitic crystalline aluminosilicate in a siliceous matrix at a temperature below 1300°F. rendering said material catalytically active, and
   b. heating said material in the absence of steam at temperature above about 1300°F. and below the thermal destructive temperature of said zeolitic crystalline aluminosilicate.

16. A process according to claim 15 wherein the temperature in step (b) is about 1400° to about 1550°F.

17. A process according to claim 15 wherein the zeolitic crystalline aluminosilicate is selected from the group consisting of faujasite, zeolite X, zeolite Y and mordenite.

18. A catalytic cracking catalyst prepared by the method of claim 15.

19. A catalytic cracking catalyst prepared by the method of claim 16.

20. A catalytic cracking catalyst prepared by the method of claim 17.

21. A process of preparing a catalytic cracking catalyst which comprises:
   a. calcining a material comprising zeolitic crystalline aluminosilicate in a siliceous matrix at a temperature below about 1300°F. rendering said material catalytically active, b. heating said material in the presence of steam at a temperature of 1000° to 1400°F., and
c. heating said material in the absence of steam at a temperature above about 1300°F. and below the thermal destruction temperature of said zeolitic crystalline aluminosilicate.

22. A process according to claim 21 wherein the temperature of step (c) is about 1400° to about 1550°F.

23. A process according to claim 21 wherein the zeolitic crystalline aluminosilicate is selected from the group consisting of faujasite, zeolite X, zeolite Y and mordenite.

24. A catalytic cracking catalyst prepared by the method of claim 21.

25. A catalytic cracking catalyst prepared by the method of claim 22.

26. A catalytic cracking catalyst prepared by the method of claim 23.

* * * * *